Nov. 24, 1936.  R. H. MAUTSCH  2,061,915
THERMOSTAT CONTROL APPARATUS
Filed May 9, 1935  4 Sheets-Sheet 1

INVENTOR
ROBERT HENRI MAUTSCH
BY *Wm. W. Cady*
ATTORNEY

Nov. 24, 1936.　　　　R. H. MAUTSCH　　　　2,061,915

THERMOSTAT CONTROL APPARATUS

Filed May 9, 1935　　　　4 Sheets-Sheet 2

INVENTOR
ROBERT HENRI MAUTSCH
BY *Wm. M. Cady*
ATTORNEY

Nov. 24, 1936.   R. H. MAUTSCH   2,061,915

THERMOSTAT CONTROL APPARATUS

Filed May 9, 1935    4 Sheets-Sheet 3

INVENTOR
ROBERT HENRI MAUTSCH
BY Wm. M. Cady
ATTORNEY

Nov. 24, 1936.　　　　R. H. MAUTSCH　　　　2,061,915
THERMOSTAT CONTROL APPARATUS

Filed May 9, 1935　　　　4 Sheets-Sheet 4

INVENTOR
ROBERT HENRI MAUTSCH
BY Wm. M. Cady
ATTORNEY

Patented Nov. 24, 1936

2,061,915

UNITED STATES PATENT OFFICE 2,061,915

THERMOSTAT CONTROL APPARATUS

Robert Henri Mautsch, Brussels, Belgium, assignor to The Westinghouse Air Brake Company, Wilmerding, Pa., a corporation of Pennsylvania Application May 9, 1935, Serial No. 20,571
In Belgium September 26, 1934

14 Claims. (Cl. 297—11)

This invention relates to thermostatic control apparatus of the kind in which the expansion or contraction of a metallic element under the influence of variations in the temperature to which the element is subjected is utilized to control the operation of any device to be thermostatically controlled and has for its object to provide improved apparatus of this character which shall be particularly sensitive and accurate in operation, unaffected by vibration and proof against damage by sudden considerable temperature variations.

The improved apparatus of the invention is moreover adapted to provide a substantially linear regulating characteristic over a wide range of operating temperatures and by the elimination of articulated parts in the mechanism for amplifying the expansion or contraction of the element, any inaccuracy due to lost motion or play is avoided while the adjustment of the apparatus for operation under various conditions is effected in a particularly simple and precise manner.

The invention is particularly although not exclusively applicable to apparatus for the control of electric circuits in which thermostatically operated contacts are required to be positively and reliably actuated under predetermined temperature conditions.

According to the principal feature of the invention one end of the metallic element is connected through a non-articulated joint to one end of an intermediate member the other end of which is similarly connected to a suitable point in a relatively non-expansible element, in such a manner that the expansion or contraction of the metallic element due to temperature variations causes a couple to be exerted upon the intermediate member the movement of which under the action of this couple is arranged to effect the desired control.

Figure 1:
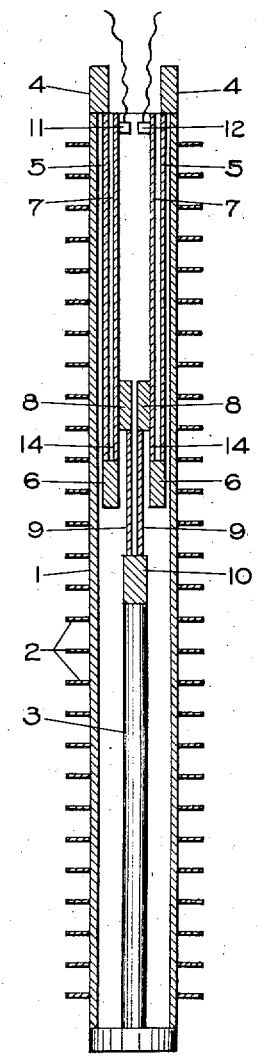
Figure 2:
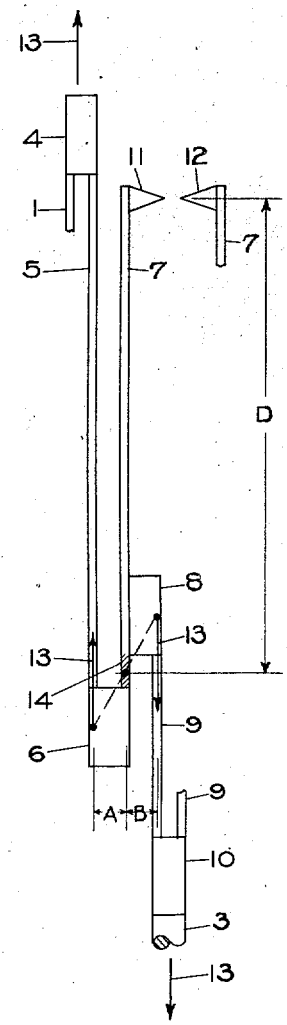
Figure 3:
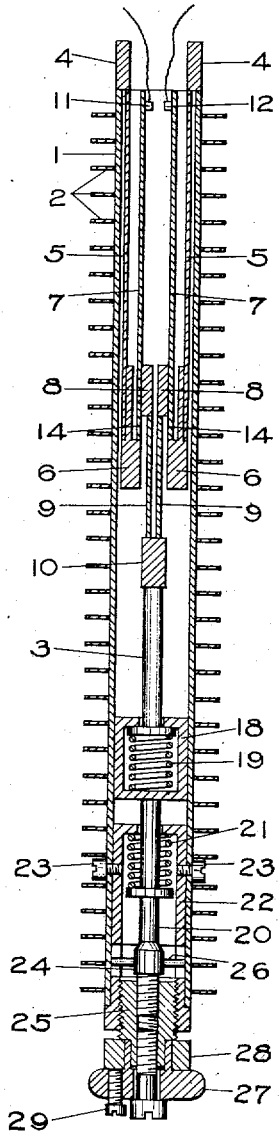
Figure 4:
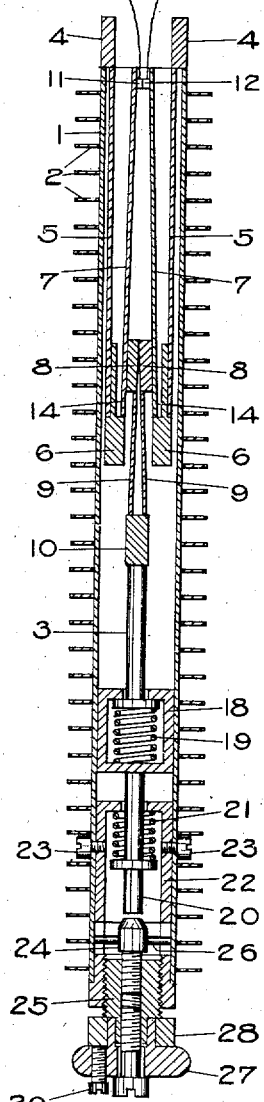
Figure 5:
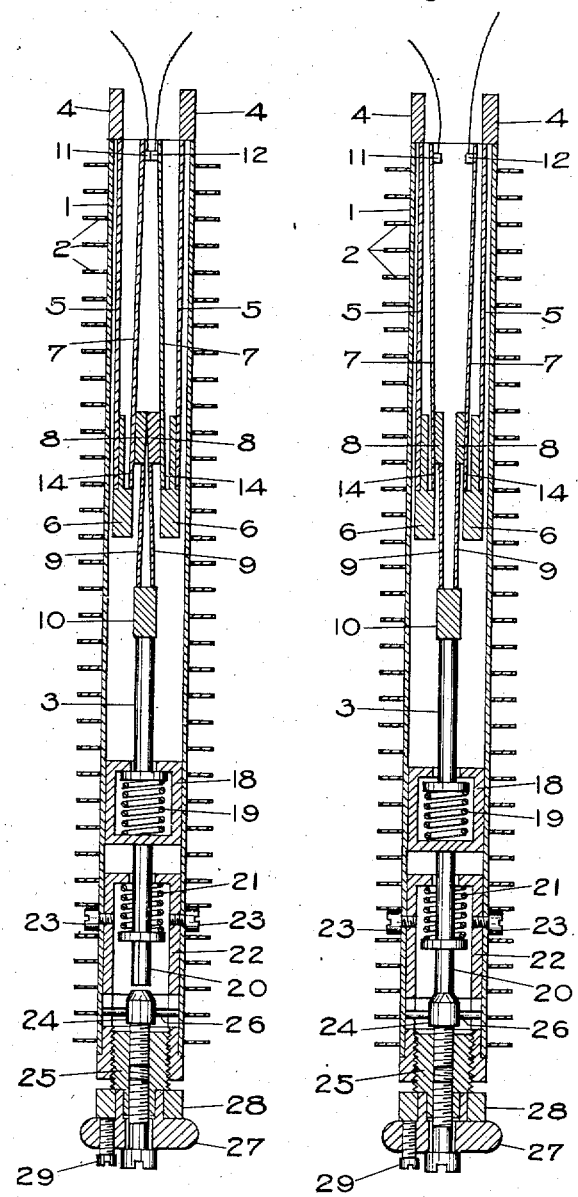
Figure 6:
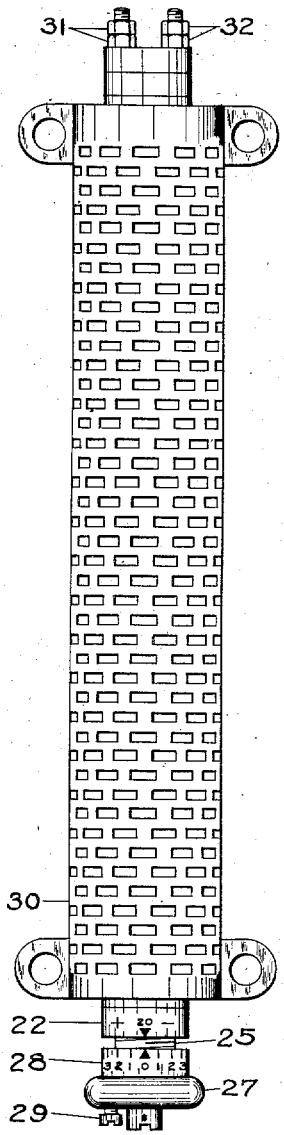
Figure 8:
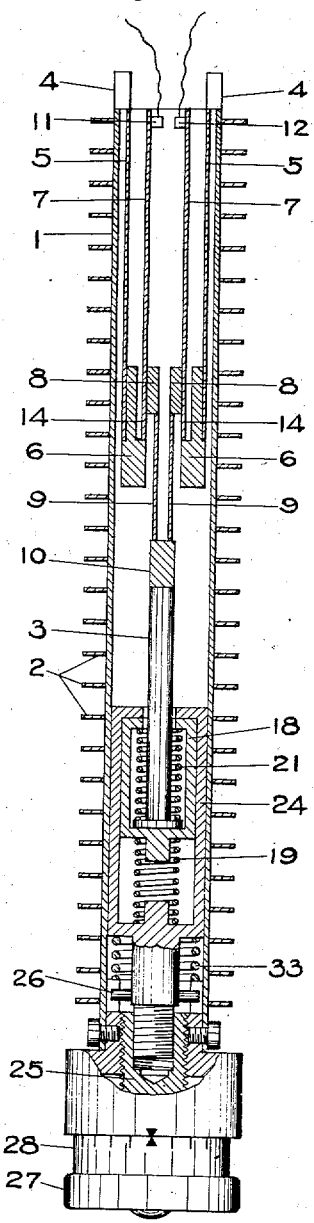
Figure 9:
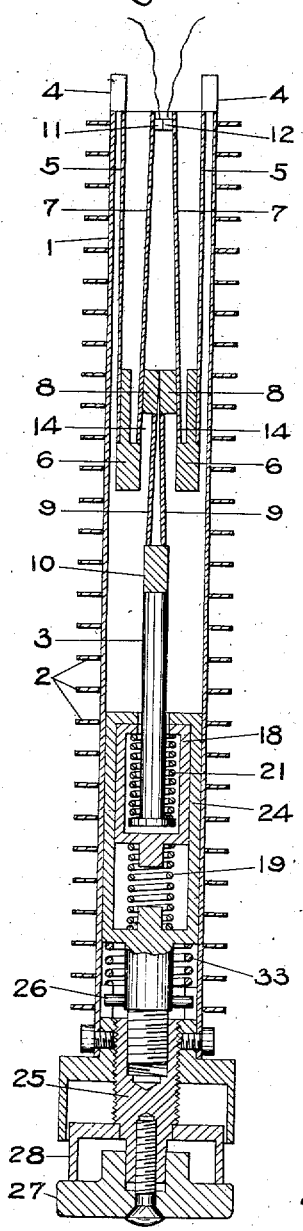
Figure 10:
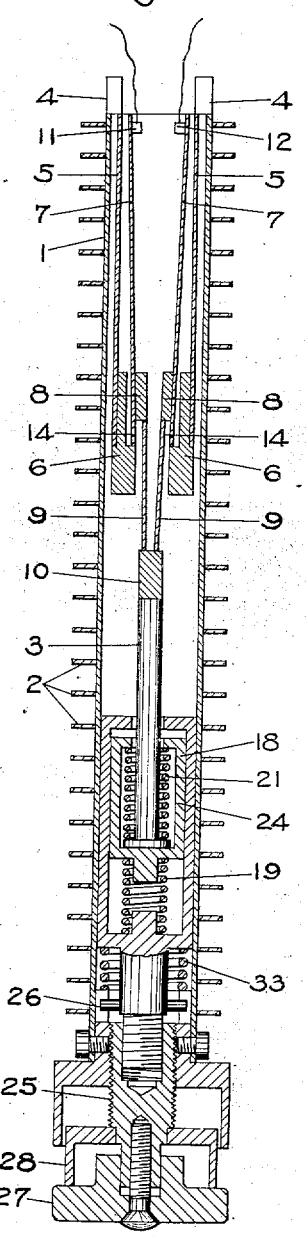

The invention is illustrated by way of example in the accompanying drawings, Figure 1 of which is a sectional view of a simple form of thermostatic control apparatus embodying one form of the invention, Figure 2 being a diagrammatic view thereof illustrating its action. Figures 3, 4 and 5 are sectional views similar to Figure 1 but illustrating a construction embodying regulating and compensating arrangements, these figures showing the position of the parts of the apparatus under different temperature conditions. Figure 6 is a view in side elevation of the complete apparatus shown in Figures 3, 4 and 5, Figure 7 being a similar view with the outer casing removed. Figures 8, 9 and 10 are sectional views similar to Figures 3, 4 and 5 respectively but illustrating a somewhat modified construction.

Referring now first to Figures 1 and 2 of the drawings it will be seen that the apparatus comprises a metallic element in the form of a tube 1, provided with external heat radiating fins 2, to the lower end of which is secured one end of a relatively non-expansible rod 3, coaxially arranged within the tube 1. The upper end of the tube 1 is connected by means of soldered joints indicated at 4 to the upper ends of metallic strips 5, the lower ends of which are connected by similar joints 6 to the lower ends of a pair of contact strips 7. Intermediate points in the strips 7 are secured by soldered joints 8 to the upper ends of a pair of strips 9, the lower ends of which are rigidly connected to the upper end of the rod 3 as indicated at 10. The upper ends of the strips 7 are provided with contact pieces 11, 12 adapted to cooperate to control an electric circuit which in turn controls the operation of any desired device to be controlled. In this construction it will be understood that the portion of the strips 7 between the joints 6 and 8 constitutes the intermediate member hereinbefore referred to.

The operation of the apparatus is as follows:—

Assuming that the parts occupy the positions shown in Figures 1 and 2 and that the apparatus is subjected to an increase in temperature, the tube 1 will expand relative to the rod 3 with the result that a pull, as indicated by the arrows 13 in Figure 2, will be exerted between the tube 1 and the rod 3, this pull being transmitted to the strips 5 and 9 through the joints 4 and 10. The tension thus exerted on each of the strips 5 and 9 is transmitted through the joints 6 and 8 to the lower portion of each of the strips 7 constituting as above explained the intermediate member.

As clearly shown in Figure 2 the tension exerted on each of the strips 5 and 9 exerts a couple on the intermediate member tending to rotate the latter in a clockwise direction. As a result the upper portion of one of the strips 7, the lower portions of which constitute the intermediate member, will be moved toward the right so as to cause the contact 11 carried thereby to engage with a corresponding contact 12 on the other contact strip 7, which is of course moved toward the left.

In Figure 2 the portion of the strip 7 constituting the intermediate member is indicated at 14 and it will be understood that the moment of the couple exerted upon this intermediate portion is dependent upon the distances A, B laterally separating the strips 5 and 9 from the strip 7. The movement of the intermediate member due to the couple above referred to will evidently cause an amplified movement of the upper end of the strip 7 carrying the circuit contact, the amplification being as shown in Figure 2 dependent upon the ratio of the distance D separating the contacts from the middle point of the intermediate member relative to the distances A and B.

It should be observed that the distances A and B need not as shown be equal to one another but may have any desired relation to suit particular requirements in practice, since if each of the contacts 11, 12 under the action of the couple on the intermediate member is moved through a distance equal to one-half of that normally separating these contacts, a still further amplification of the movement is obtained. Owing to the fact that the couple effecting the actuation of the control contacts is due to the linear expansion of the tube 1 it will be evident that the apparatus has a linear operating characteristic in response to temperature variations while the provision of the soldered joints between the various parts which thus form a continuous mechanical linkage not involving any articulated joints, eliminates the possibility of any play or lost motion in the operation of the apparatus.

In practice it is found for instance that with an aluminum tube 1 having a length of one meter the expansion of which is 0.000025 m. per degree C. increase in temperature, an amplification of forty times can readily be obtained. Assuming that the distance separating the contacts 11, 12 is 1 mm. so that a movement of 0.5 mm. is required to bring the contacts into engagement with one another, this extent of movement will evidently be obtained for an increase in temperature of the apparatus of 1° C. The normal distance separating the contacts 11, 12 may however be reduced in practice to 0.2 mm. so that a movement of only 0.1 mm. for each contact is required and this movement will be effected by an expansion of the tube 1 of 0.000005 m. corresponding to a temperature increase of only 0.2° C.

It will thus be seen that the apparatus can be arranged to operate with an extremely small temperature variation and is much more sensitive than any known form of thermostatic device. Furthermore by the provision of optical devices of any suitable type controlled by the movement of the strips 7 a much higher degree of sensitivity can be obtained as will be readily understood.

Referring now to Figures 3, 4 and 5 in the construction therein shown the rod 3 is connected at its lower end to a stirrup member 18 with the interposition of a compression spring 19, the member 18 being secured to a rod 20, a spring 21 being interposed between a collar on the rod 20 and an internal sleeve 22 secured by means of the screws 23 to the tube 1. The lower end of the rod 20 is adapted, under certain conditions, to engage with a stop member 24 which is screw-threaded into a plug 25, the member 24 being provided with a transverse pin 26 adapted to slide in slots in the sleeve 22 so as to prevent the rotation of the member 24. The plug 25 is provided with external screw threads adapted to engage in the corresponding internally screw-threaded end of the sleeve 22 and is rigidly secured to an operating knob or handle 27. Interposed between the lower end of the sleeve 22 and the knob 27 is a collar 28 which is rotatably adjustable relative to the sleeve 22 and is secured in position after adjustment by means of a set screw 29.

The pitch of the screw thread on the plug 25 is arranged to be different from the pitch of the screw thread on the lower end of the stop member 24 so that by rotating the plug 25 by means of the knob 27 the position of the stop member 24 in the axial direction within the sleeve 22 can be adjusted with a high degree of precision owing to the differential action of the two screw threads.

The action of the apparatus shown in Figures 3, 4 and 5 is as follows:—

Figure 3 shows the parts of the apparatus in their normal adjustment for operation, it being observed that the control contacts 11, 12 are separated by the normal distance required. Under these conditions the lower end of the rod 20 is in contact with the upper end of the stop member 24, having been adjusted to this position by the rotation of the knob 27.

If, now, the apparatus is transferred to a space in which the temperature is higher than the temperature for which the apparatus had been adjusted to its normal setting as shown in Figure 3, the expansion of the tube 1 will cause a pull to be exerted upon the rod 3 through the intermediary of the sleeve 22, the spring 21 and the stirrup member 18.

The first part of this expansion movement of the tube 1 will cause the control contacts 11, 12 to be moved into engagement with one another as shown in Figure 4 the further movement of the tube 1 effecting the compression of the spring 21, and causing the stop member 24 to move out of engagement with the lower end of the rod 20 so that the parts assume the position shown in Figure 4. In order to readjust the apparatus for the new temperature to which it is subjected the knob 27 is rotated so as to bring the stop member 24 into engagement with the lower end of the rod 20 and to move this rod in an upward direction to permit the control contacts to resume their normal position shown in Figure 3. The set screw 29 is then slackened and the collar 28 is rotated relative to the plug 25 so as to bring a zero mark on the collar opposite to a zero mark on the lower end of the sleeve 22. The collar 28 is then locked in its adjusted position by means of a set screw 29 and the apparatus is in readiness for operation at the new temperature.

If, on the other hand the apparatus when adjusted to the position shown in Figure 3 is transferred to a space at a lower temperature the consequent contraction of the tube 1 will cause the stop member 24 to raise the rod 20 and stirrup member 18 to separate the control contacts to the position shown in Figure 5, any further contraction of the tube 1 being taken up by the compression of the spring 19.

In these circumstances, in order to readjust the apparatus to the conditions shown in Figure 3, the knob 27 must be rotated in the opposite direction to that above described so as to move the stop member 24 downwards and permit the rod 20 to move downwards under the action of the spring 21 and after the spring 19 has been again expanded to its normal condition within the stirrup member 18 to allow the rod 3 to move downwards and restore the control contacts to the position shown in Figure 3.

After this adjustment has been effected the collar 28 is readjusted to its proper zone position as above explained. It will be understood that the compensating arrangements above described comprising the springs 19, 21 protect the sensitive parts of the apparatus against injury due to the apparatus being operated under widely different temperature conditions from time to time.

Figure 7:
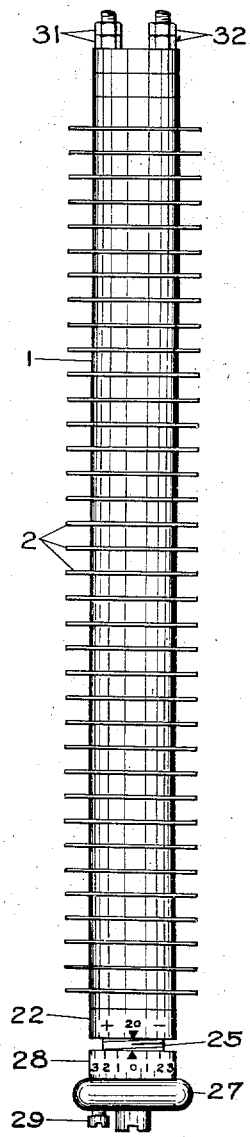

As shown in Figure 7, the collar 28 is provided with a number of graduations to the right and left of its zero mark and it will be understood that once the apparatus has been set for the normal temperature of the space in which it is to be operated in the manner above described, a fine adjustment of the control contacts can be effected by rotating the knob 27 to an extent defined by the graduations on the collar 28. The apparatus can thus when adjusted in the manner above described be set to effect the engagement of the control contacts for any desired small temperature variations the normal distance between the contacts being varied for this purpose as will be apparent without further description.

The tube 1 provided with fins 2 as above described is preferably adapted to be enclosed in a perforated outer casing 30 as indicated in Figure 6, suitable terminals 31, 32 for the control circuit being provided as clearly shown in Figures 6 and 7.

In the modification shown in Figures 8, 9 and 10 the stirrup member 18 is mounted in a sleeve forming the stop member 24, which is, as in the construction previously described with reference to Figures 3, 4 and 5, adapted to be axially adjusted relatively to the tube 1 by means of the knob 27.

Figure 8 corresponding to Figure 3, shows the parts of the apparatus in their normal adjustment for operation, Figures 9 and 10 on the other hand showing the abnormal position of the parts for temperature conditions corresponding to those of Figures 4 and 5.

As shown in Figure 9 when the apparatus is removed to a higher surrounding temperature the stop sleeve 24 moves downwards with the tube 1 carrying with it the stirrup member 18 and compressing the spring 21. As in the previous construction, in order to restore the parts to their previous normal adjustment, the knob 27 is rotated so as to move the stop sleeve 24 upwards and permit the stirrup member 18 to return to its normal position relative to the rod 3.

Under the temperature conditions corresponding to Figure 10 the stop sleeve 24 has moved upwards with respect to the stirrup member 18 compressing the spring 19 and the restoration of the parts to the normal position is effected by rotating the knob 27 in the reverse direction to that previously described as will be obvious without further explanation.

A spring 33 may be provided in order to prevent backlash between the stop 24 and the plug plug 25.

It will be apparent that the thermostatic control effected by the apparatus is dependent upon the temperature variations and consequently expansion or contraction to which the tube 1 as a whole is subjected and, since the dimensions of the tube 1 are considerable, the apparatus is not liable to be affected by small local draughts or air currents which would impair its proper operation. The rapidity of response of this thermostatic apparatus is very considerably increased by the provision of fins 2 on the tube 1 which greatly increase the area available for heat exchange.

It will be evident that the improved thermostatic apparatus of the invention may also be applied to other purposes than the control of electric contacts. For example the couple exerted upon the intermediate member may be arranged to be transmitted through non-articulated amplifying mechanism similar to that above described and illustrated to a needle or other type of valve controlling the flow of fluid under pressure. The valve may for instance be a valve controlling the release of fluid from one side of a movable abutment so as to effect the movement of the abutment for operating any desired mechanism.

The improved apparatus of the invention is particularly suitable for use in controlling the temperature of railway vehicles by reason mainly of its being unaffected by small local air currents or by vibration but the invention is also applicable to a large number of different purposes or conditions of operation and possesses very considerable advantages from the point of view of precision, accuracy of adjustment, sensitivity and reliability.

The invention is evidently not limited to the particular construction above described by way of example which may be varied in many respects without exceeding the scope of the invention.

Having now described my invention, what I claim as new and desire to secure by Letters Patent, is:

1. In a thermostat, in combination, an element adapted to expand and contract under the influence of variations of temperature to which the element is subjected, a control member movable in directions transversely of the longitudinal center line of the element, and means connected by non-articulated joints to said element and control member operative upon the expansion or contraction of said element to actuate the control member.

2. In a thermostat, in combination, an element adapted to expand and contract under the influence of variations of temperature to which the element is subjected, a control member, and means movable back and forth transversely of the longitudinal center line of the element connected to said element at the opposite ends of the control member by non-articulated joints and to said control element by non-articulated joints, operative upon the expansion or contraction of said element to actuate the control member.

3. In a thermostat, in combination, an element adapted to expand and contract under the influence of variations of temperature to which the element is subjected, a movable control member, a force transmitting member secured to said element and control member, a force transmitting member secured to said control element at a point beyond the connection between the first mentioned force transmitting member and the control member and also secured to said element, said force transmitting elements cooperating to effect the operation of said control member when said element contracts or expands.

4. In a thermostat, in combination, an element adapted to expand and contract under the influence of variations of temperature to which the element is subjected, a movable control member, a force transmitting member secured at one end to one end of the control member and secured at the other end to said element, a force transmitting member extending in the opposite direction to the first mentioned force transmitting member and secured at one end to said control member at a point intermediate the ends of the control member and secured at the other end to said element, said force transmitting elements cooperating with said element and control member to actuate the control member according to the expansion and contraction of the element.

5. In a thermostat, in combination, an element adapted to expand and contract under the influence of variations of temperature to which the element is subjected, a movable control member, a force transmitting member secured at one end to said element, a force transmitting member extending in the opposite direction to the first mentioned force transmitting member and secured at one end to said element, and a yieldable non-articulated couple between the adjacent ends of said force transmitting members and control member for actuating the control member.

6. In a thermostat, in combination, an element adapted to expand and contract under the influence of variations of temperature to which the element is subjected, a movable control member, two oppositely extending force transmitting members having their outer ends connected to said element and their inner ends overlying each other, and a yieldable non-articulated couple connecting the inner ends of said force transmitting members and the control member and operative to effect movement of the control member.

7. In a thermostat, in combination, an element adapted to expand and contract under the influence of variations of temperature to which the element is subjected, a movable control member, a force transmitting member of less length than said element arranged substantially parallel with the element and connected at its outer end to one end of the element, another force transmitting member of less length than said element arranged substantially parallel with the element and connected at its outer end to the element, and a yieldable non-articulated couple between the inner ends of said force transmitting members and the control member for effecting movement of the control member according to the forces set up in said force transmitting members.

8. In a thermostat, in combination, a metallic tube adapted to expand and contract in the direction of its length under the influence of variations of temperature to which the tube is subjected, a movable control member in said tube, a force transmitting member in said tube and secured at its outer end to one end of the tube, another force transmitting member in said tube and secured at its outer end to the other end of the tube, and a non-articulated couple between the inner ends of said force transmitting members and control member operable according to the forces applied thereto by said force transmitting members to effect the control movement of the control member.

9. In a thermostat, in combination, a metallic tube adapted to expand and contract in the direction of its length under the influence of variations of temperature to which the tube is subjected, a movable control member in said tube, a force transmitting member in said tube, spaced from said control member and secured at its outer end to one end of the tube, means rigidly securing the inner ends of the control member and force transmitting member together in spaced relation, another force transmitting member in said tube spaced from said control element and secured at its outer end to the other end of the tube, the inner end of said other force transmitting member overlying the inner ends of the control member and the first mentioned force transmitting member, and means rigidly connecting the inner end of said other force transmitting member to said control member at a point intermediate the ends of the control member, both of said means and the portion of the control member extending therebetween constituting a non-articulated couple operable according to the forces transmitted thereto by said force transmitting members to actuate the control member.

10. In a thermostat, in combination, an element adapted to expand and contract under the influence of variations of temperature to which the element is subjected, a control member normally movable a predetermined distance back and forth transversely of the longitudinal center line of the element, means connected by non-articulated joints to said element and control member operative upon the expansion or contraction of said element to actuate the control member, adjusting means cooperating with said element and said means operable to effect the operation of said means for positioning said means and thereby the control member for normal operation under any one of a chosen range of temperatures, and means operative manually for actuating the adjusting means.

11. In a thermostat, in combination, an element adapted to expand and contract under the influence of variations of temperature to which the element is subjected, a control member normally movable a predetermined distance in directions transversely of the longitudinal center line of the element, two oppositely extending transmitting force members having their outer ends connected to said element and their inner ends overlying each other, a yieldable non-articulated couple connecting the inner ends of said force transmitting members and the control member and operative to effect movement of the control member, means carried by said element and cooperating with one of said force transmitting members and operable for adjusting said couple and thereby said control member for normal operation within any chosen range of temperatures, and means carried by said element and operative manually for operating the last mentioned means.

12. In a thermostat, in combination, an element adapted to expand and contract under the influence of variations of temperature to which the element is subjected, a control member normally movable a predetermined distance in directions transversely of the longitudinal center line of the element, a force transmitting member of less length than said element arranged substantially parallel with the element and connected at its outer end to one end of the element, another force transmitting member of less length than said element arranged substantially parallel with the element and connected at its outer end to the element, a yieldable non-articulated couple between the inner ends of said force transmitting members and the control member for effecting movement of the control member according to the forces set up in said force transmitting members, and means cooperating with said element and the outer end of the second mentioned force transmitting member and controlled manually for adjusting said couple for normal operation within any chosen range of temperatures.

13. In a thermostat, in combination, a metallic tube adapted to expand and contract in the direction of its length under the influence of variations of temperature to which the tube is subjected, a control member in said tube normally movable a predetermined distance in directions transversely of the longitudinal center line of the tube, a force transmitting member in said tube and secured at its outer end to one end of the tube, another force transmitting member in said tube and secured at its outer end to the other end of the tube, a non-articulated couple between the inner ends of said force transmitting members and control member operable according to the forces applied thereto by said force transmitting members to effect the control movement of the control member, and means cooperating with said tube and the outer end of the second mentioned force transmitting member and controlled manually for adjusting said couple for normal operation within any chosen range of temperatures.

14. In a thermostat, in combination, an element adapted to expand and contract under the influence of variations of temperature to which the element is subjected, a control member normally movable a predetermined distance in directions transversely of the longitudinal center line of the element, means connected by non-articulated joints to said element and control member operative upon the longitudinal expansion or contraction of said element to actuate the control member, and adjusting means cooperating with said element and means manually operative to adjust the control member, when the expansion or contraction of said element has been excessive, to move its normal predetermined distance at the temperature which caused said excessive expansion or contraction of the element.

ROBERT HENRI MAUTSCH.

CERTIFICATE OF CORRECTION.

Patent No. 2,061,915.  November 24, 1936.

ROBERT HENRI MAUTSCH.

It is hereby certified that error appears in the printed specification of the above numbered patent requiring correction as follows: Page 3, second column, lines 41 and 42, claim 2, strike out the words "movable back and forth transversely of the longitudinal center line of the element" and insert the same after "member" and before the comma in line 40, same claim; and that the said Letters Patent should be read with this correction therein that the same may conform to the record of the case in the Patent Office.

Signed and sealed this 2nd day of February, A. D. 1937.

(Seal)

Leslie Frazer
Acting Commissioner of Patents.

tions of temperature to which the tube is subjected, a control member in said tube normally movable a predetermined distance in directions transversely of the longitudinal center line of the tube, a force transmitting member in said tube and secured at its outer end to one end of the tube, another force transmitting member in said tube and secured at its outer end to the other end of the tube, a non-articulated couple between the inner ends of said force transmitting members and control member operable according to the forces applied thereto by said force transmitting members to effect the control movement of the control member, and means cooperating with said tube and the outer end of the second mentioned force transmitting member and controlled manually for adjusting said couple for normal operation within any chosen range of temperatures.

14. In a thermostat, in combination, an element adapted to expand and contract under the influence of variations of temperature to which the element is subjected, a control member normally movable a predetermined distance in directions transversely of the longitudinal center line of the element, means connected by non-articulated joints to said element and control member operative upon the longitudinal expansion or contraction of said element to actuate the control member, and adjusting means cooperating with said element and means manually operative to adjust the control member, when the expansion or contraction of said element has been excessive, to move its normal predetermined distance at the temperature which caused said excessive expansion or contraction of the element.

ROBERT HENRI MAUTSCH.

CERTIFICATE OF CORRECTION.

Patent No. 2,061,915. November 24, 1936.

ROBERT HENRI MAUTSCH.

It is hereby certified that error appears in the printed specification of the above numbered patent requiring correction as follows: Page 3, second column, lines 41 and 42, claim 2, strike out the words "movable back and forth transversely of the longitudinal center line of the element" and insert the same after "member" and before the comma in line 40, same claim; and that the said Letters Patent should be read with this correction therein that the same may conform to the record of the case in the Patent Office.

Signed and sealed this 2nd day of February, A. D. 1937.

Leslie Frazer
Acting Commissioner of Patents.

(Seal)

CERTIFICATE OF CORRECTION.

Patent No. 2,061,915.  November 24, 1936.

ROBERT HENRI MAUTSCH.

It is hereby certified that error appears in the printed specification of the above numbered patent requiring correction as follows: Page 3, second column, lines 41 and 42, claim 2, strike out the words "movable back and forth transversely of the longitudinal center line of the element" and insert the same after "member" and before the comma in line 40, same claim; and that the said Letters Patent should be read with this correction therein that the same may conform to the record of the case in the Patent Office.

Signed and sealed this 2nd day of February, A. D. 1937.

(Seal)

Leslie Frazer
Acting Commissioner of Patents.